United States Patent
Buehler et al.

(10) Patent No.: US 9,399,845 B2
(45) Date of Patent: Jul. 26, 2016

(54) CRASH ATTENUATOR

(71) Applicant: Energy Absorption Systems, Inc., Dallas, TX (US)

(72) Inventors: Michael J. Buehler, Roseville, CA (US); Sean Thompson, Elk Grove, CA (US); Patrick A. Leonhardt, Rocklin, CA (US)

(73) Assignee: Energy Absorption Systems, Inc., Dallas, TX (US)

( * ) Notice: Subject to any disclaimer, the term of this patent is extended or adjusted under 35 U.S.C. 154(b) by 0 days.

(21) Appl. No.: 14/477,038

(22) Filed: Sep. 4, 2014

(65) Prior Publication Data
US 2015/0069771 A1   Mar. 12, 2015

Related U.S. Application Data

(60) Provisional application No. 61/876,523, filed on Sep. 11, 2013.

(51) Int. Cl.
*E01F 15/14* (2006.01)
*B60R 19/38* (2006.01)
*B60R 19/00* (2006.01)

(52) U.S. Cl.
CPC .............. *E01F 15/148* (2013.01); *B60R 19/00* (2013.01); *B60R 19/38* (2013.01); *B60R 2019/005* (2013.01)

(58) Field of Classification Search
CPC .. B60R 2019/005; B60R 19/38; E01F 15/148
USPC .............. 293/118, 133; 296/187.03; 188/376, 188/377
See application file for complete search history.

(56) References Cited

U.S. PATENT DOCUMENTS

| | | | |
|---|---|---|---|
| 2,984,512 A | 5/1961 | Shaginaw | |
| 3,506,295 A | 4/1970 | Yancey | |
| 3,674,115 A | 7/1972 | Young et al. | |
| 3,717,223 A * | 2/1973 | Alfes | 188/377 |
| 3,757,562 A | 9/1973 | Goldberg et al. | |
| 3,930,665 A | 1/1976 | Ikawa | |
| 3,944,187 A | 3/1976 | Walker | |
| 3,972,390 A | 8/1976 | Melton et al. | |

(Continued)

FOREIGN PATENT DOCUMENTS

| | | |
|---|---|---|
| DE | 1239581 B | 4/1967 |
| GB | 2286160 A | 8/1995 |

(Continued)

OTHER PUBLICATIONS

Marquis, E.C., et al., "Texas Crash Cushion Trailer to Protect Highway Maintenance Vehicles" Research Report 146-6, Texas Transportation Institute, College Station Texas, 1972, 45 pages.

(Continued)

*Primary Examiner* — Jason S Morrow
(74) *Attorney, Agent, or Firm* — Brinks Gilson & Lione

(57) ABSTRACT

A crash attenuator includes a frame having a first frame member and a second frame member rigidly connected with a hinge assembly in a pre-impact configuration. The first and second frames are hingedly connected with the hinge assembly in an impact configuration, wherein the hinge assembly comprises a living hinge when the hinge assembly is in the impact configuration. A method of using the crash attenuator is also provided.

23 Claims, 5 Drawing Sheets

(56) References Cited

U.S. PATENT DOCUMENTS

| | | | |
|---|---|---|---|
| 4,008,915 | A | 2/1977 | Walker |
| 4,071,970 | A | 2/1978 | Strizki |
| 4,190,275 | A | 2/1980 | Mileti |
| 4,204,659 | A | 5/1980 | Phillips et al. |
| 4,221,413 | A | 9/1980 | Bonnetain |
| 4,227,593 | A | 10/1980 | Bricmont et al. |
| 4,352,484 | A | 10/1982 | Gertz et al. |
| 4,407,484 | A | 10/1983 | Meinzer |
| 4,413,856 | A | 11/1983 | McMahan et al. |
| 4,452,431 | A | 6/1984 | Stephens et al. |
| 4,552,341 | A | 11/1985 | Zucker et al. |
| 4,600,178 | A | 7/1986 | Zucker et al. |
| 4,635,981 | A | 1/1987 | Friton |
| 4,655,434 | A | 4/1987 | Bronstad |
| 4,658,941 | A | 4/1987 | Gottwald et al. |
| 4,674,911 | A | 6/1987 | Gertz |
| 4,711,481 | A | 12/1987 | Krage et al. |
| 4,770,420 | A | 9/1988 | Gottwald et al. |
| 5,052,732 | A | 10/1991 | Oplet et al. |
| 5,123,775 | A | 6/1992 | Bryant |
| 5,199,755 | A | 4/1993 | Gertz |
| 5,248,129 | A | 9/1993 | Gertz |
| 5,403,112 | A | 4/1995 | Carney |
| 5,403,113 | A | 4/1995 | Gertz et al. |
| 5,551,796 | A | 9/1996 | Anderson, Jr. et al. |
| 5,577,861 | A | 11/1996 | Oberth et al. |
| 5,642,792 | A | 7/1997 | June |
| 5,697,657 | A | 12/1997 | Unrath, Sr. |
| 5,797,592 | A | 8/1998 | Machado |
| 5,823,584 | A | 10/1998 | Carney, III |
| 5,851,005 | A | 12/1998 | Muller et al. |
| 5,868,521 | A | 2/1999 | Oberth et al. |
| 5,947,452 | A | 9/1999 | Albritton |
| 6,024,341 | A | 2/2000 | Gertz |
| 6,092,959 | A | 7/2000 | Leonhardt et al. |
| 6,098,767 | A | 8/2000 | Unrath |
| 6,116,805 | A | 9/2000 | Gertz |
| 6,183,042 | B1 | 2/2001 | Unrath |
| 6,186,565 | B1 | 2/2001 | Unrath |
| 6,203,079 | B1 | 3/2001 | Breed |
| 6,244,637 | B1 | 6/2001 | Leonhardt et al. |
| 6,264,258 | B1 | 7/2001 | Li et al. |
| 6,343,821 | B2 | 2/2002 | Breed |
| 6,394,513 | B2 | 5/2002 | Rossmann |
| 6,457,570 | B2 | 10/2002 | Reid et al. |
| 6,481,920 | B1 | 11/2002 | Leonhardt et al. |
| 6,523,872 | B2 | 2/2003 | Breed |
| 6,554,529 | B2 | 4/2003 | Stephens et al. |
| 6,579,034 | B1 * | 6/2003 | Welch et al. .................... 404/6 |
| 6,581,992 | B1 | 6/2003 | Gertz |
| 6,619,491 | B2 | 9/2003 | Payne et al. |
| 6,668,989 | B2 | 12/2003 | Reid et al. |
| 6,866,284 | B2 | 3/2005 | Carlsson |
| 6,886,813 | B2 | 5/2005 | Albritton |
| 6,905,282 | B2 | 6/2005 | Leonhardt et al. |
| 6,926,324 | B1 | 8/2005 | Gertz |
| 6,942,263 | B2 | 9/2005 | Welch et al. |
| 7,112,004 | B2 | 9/2006 | Alberson et al. |
| 7,125,198 | B2 | 10/2006 | Schiefferly et al. |
| 7,216,904 | B2 | 5/2007 | Thomas |
| 7,243,964 | B1 | 7/2007 | Gertz |
| 7,341,397 | B2 | 3/2008 | Murphy |
| 7,438,337 | B1 | 10/2008 | Gertz |
| 7,604,268 | B2 | 10/2009 | Unrath, Sr. |
| 7,690,687 | B2 | 4/2010 | Reid et al. |
| 7,735,614 | B2 | 6/2010 | Carlsson |
| 7,802,829 | B2 | 9/2010 | Maus |
| 7,874,572 | B2 | 1/2011 | Buehler et al. |
| 7,874,792 | B2 | 1/2011 | Tholen et al. |
| 7,931,317 | B2 | 4/2011 | Kern |
| 8,074,761 | B2 | 12/2011 | LaTurner et al. |
| 8,136,830 | B2 | 3/2012 | Buehler et al. |
| 8,276,956 | B2 | 10/2012 | Maus |
| 8,360,400 | B2 | 1/2013 | Leonhardt et al. |
| 8,388,012 | B2 | 3/2013 | Buehler et al. |
| 8,464,825 | B2 | 6/2013 | LaTurner et al. |
| 8,556,286 | B2 * | 10/2013 | Eckert et al. .................. 280/474 |
| 2003/0113160 | A1 | 6/2003 | Welch et al. |
| 2004/0251698 | A1 * | 12/2004 | Welch et al. .................. 293/133 |
| 2005/0046207 | A1 | 3/2005 | Rossmann |
| 2006/0151971 | A1 * | 7/2006 | Buehler et al. ............. 280/446.1 |
| 2007/0046041 | A1 | 3/2007 | Thomas |

FOREIGN PATENT DOCUMENTS

| | | |
|---|---|---|
| WO | WO 94/05527 A1 | 3/1994 |
| WO | WO 9405527 A1 | 3/1994 |

OTHER PUBLICATIONS

International Search Report issued in PCT Patent Application No. PCT/US14/54050, mailed Dec. 14, 2014, 8 pages.
US 6,315,490, 11/2001, Leonhardt et al. (withdrawn)

* cited by examiner

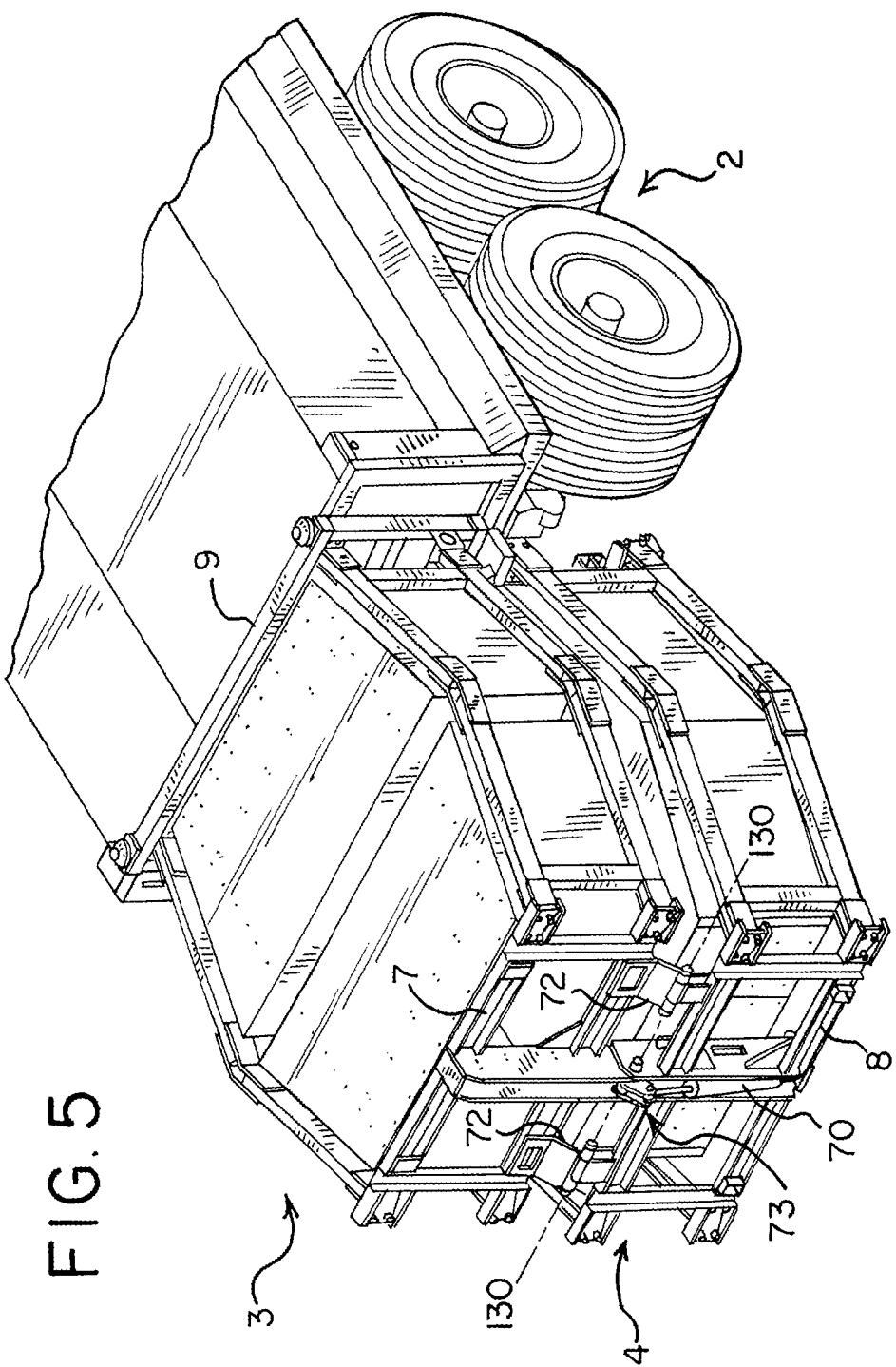

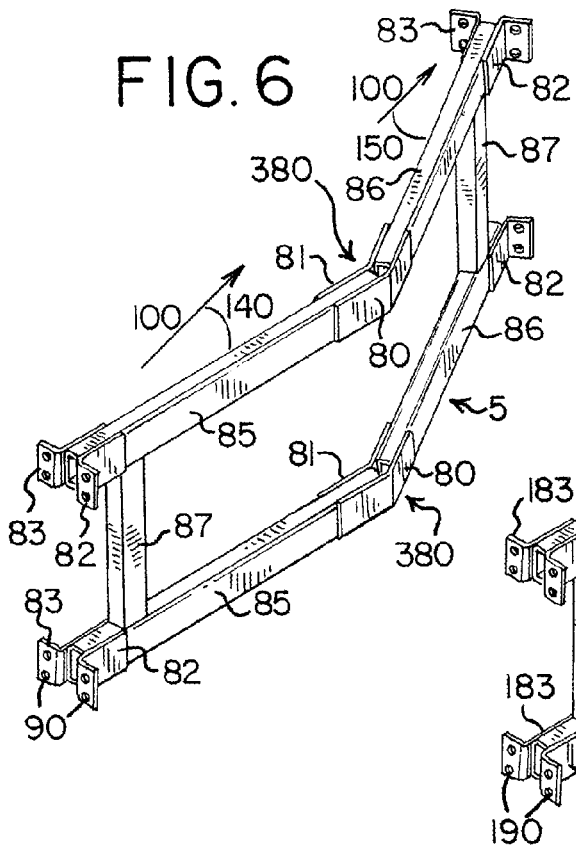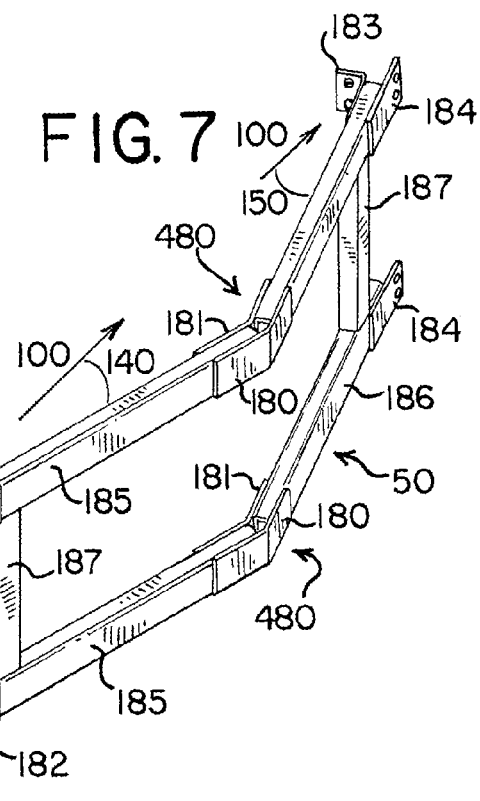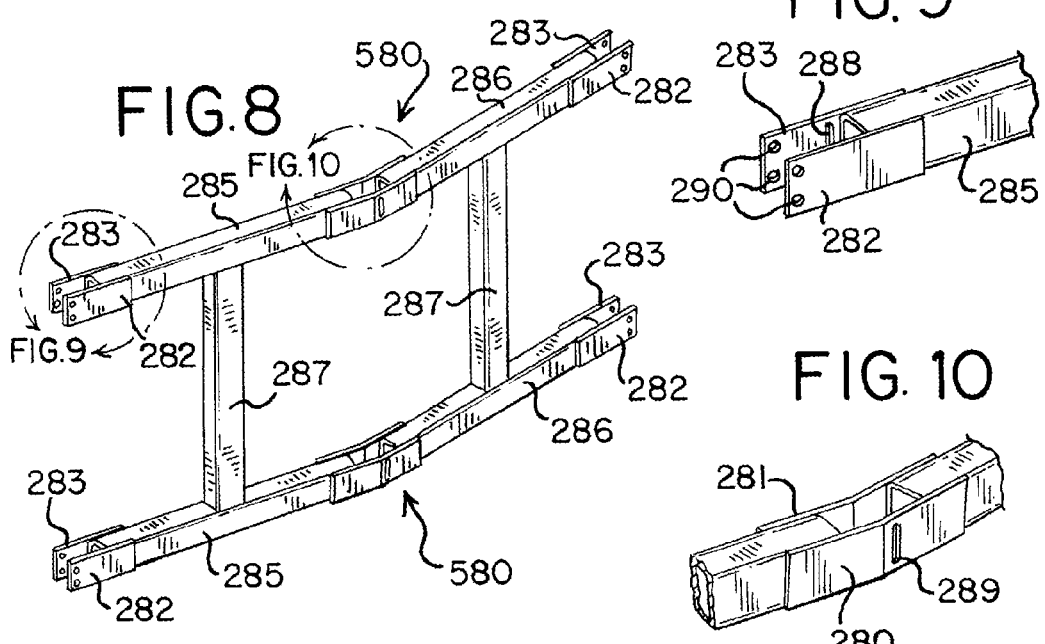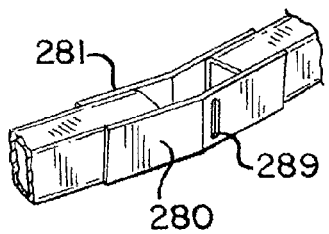

US 9,399,845 B2

CRASH ATTENUATOR

This application claims the benefit of U.S. Provisional Application No. 61/876,523, filed Sep. 11, 2013, the entire disclosure of which is hereby incorporated herein by reference.

FIELD OF THE INVENTION

The present invention relates generally to a crash attenuator, and in particular, to a crash attenuator adapted for mounting to a vehicle and which is collapsible during an impact.

BACKGROUND

Truck Mounted Attenuators (TMAs) have been used for many years on our nation's highways to protect road workers in works zones and other areas adjacent to high speed traffic. These crash cushions are typically mounted to the back of a work truck or other shadow vehicle and then placed some distance behind the work being done. In this way they protect the road workers from errant vehicles that may have left the open travel lanes and would otherwise endanger the road workers. Likewise there may be road maintenance operations that require a slow moving shadow vehicle that is driven by one of the road workers. In this instance, the driver of the shadow vehicle is also protected by the Truck Mounted attenuator, should a vehicle impact it.

The road workers are not the only ones deriving benefits from a TMA. Drivers of errant vehicles also benefit, as the impact with the crash cushion may lessen the potential injuries from such an impact.

Crash cushions, such as those disclosed in U.S. Pat. No. 5,642,792 to June and U.S. Pat. No. 6,092,959 to Leonhardt, include cartridges supported by a support structure, which may be released and allowed to collapse, for example with complex trigger mechanisms or release cables that stabilize the systems and hold them rigid until they were impacted by an errant vehicle. Such systems may be expensive, being configured with multiple hinge points that require precise welding and machining, so that all of the hinge members are aligned appropriately during assembly.

SUMMARY

The present invention is defined by the following claims, and nothing in this section should be considered to be a limitation on those claims.

In one aspect, one embodiment of a crash attenuator includes a frame having a first frame member and a second frame member rigidly connected with a hinge assembly in a pre-impact configuration. The first and second frames are hingedly connected with the hinge assembly in an impact configuration, wherein the hinge assembly comprises a living hinge when the hinge assembly is in the impact configuration.

In another aspect, a method of attenuating energy from an impacting vehicle with a crash attenuator includes providing a frame having a first frame member and a second frame member rigidly connected with a hinge assembly in a pre-impact configuration, impacting the crash attenuator, and moving the first frame member relative to the second frame member about the hinge assembly to an impact configuration, with the hinge assembly acting as a living hinge as the first and second frame members are moved to the impact configuration.

The various embodiments of the crash attenuator, and methods of manufacture and use thereof, provide significant advantages over other crash attenuator systems. For example and without limitation, the frames can be easily and quickly assembled with a minimum of parts, with the hinge assemblies providing both the rigid connection of the frame members during normal operation, and also providing a living hinge, allowing for collapse of the attenuator, during an impact configuration.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 5 is a rear perspective view of a crash attenuator attached to a vehicle in a retracted position.

FIG. 6 is a perspective view of a first side element.

FIG. 7 is a perspective view of a second side element.

FIG. 8 is a perspective view of another embodiment of a side element.

FIG. 9 is an enlarged partial view of an end portion of the side element taken along line 9 in FIG. 8.

FIG. 10 is an enlarged partial view of a hinge section of the side element taken along line 10 in FIG. 8.

DETAILED DESCRIPTION OF THE PRESENTLY PREFERRED EMBODIMENTS

Figure 1:
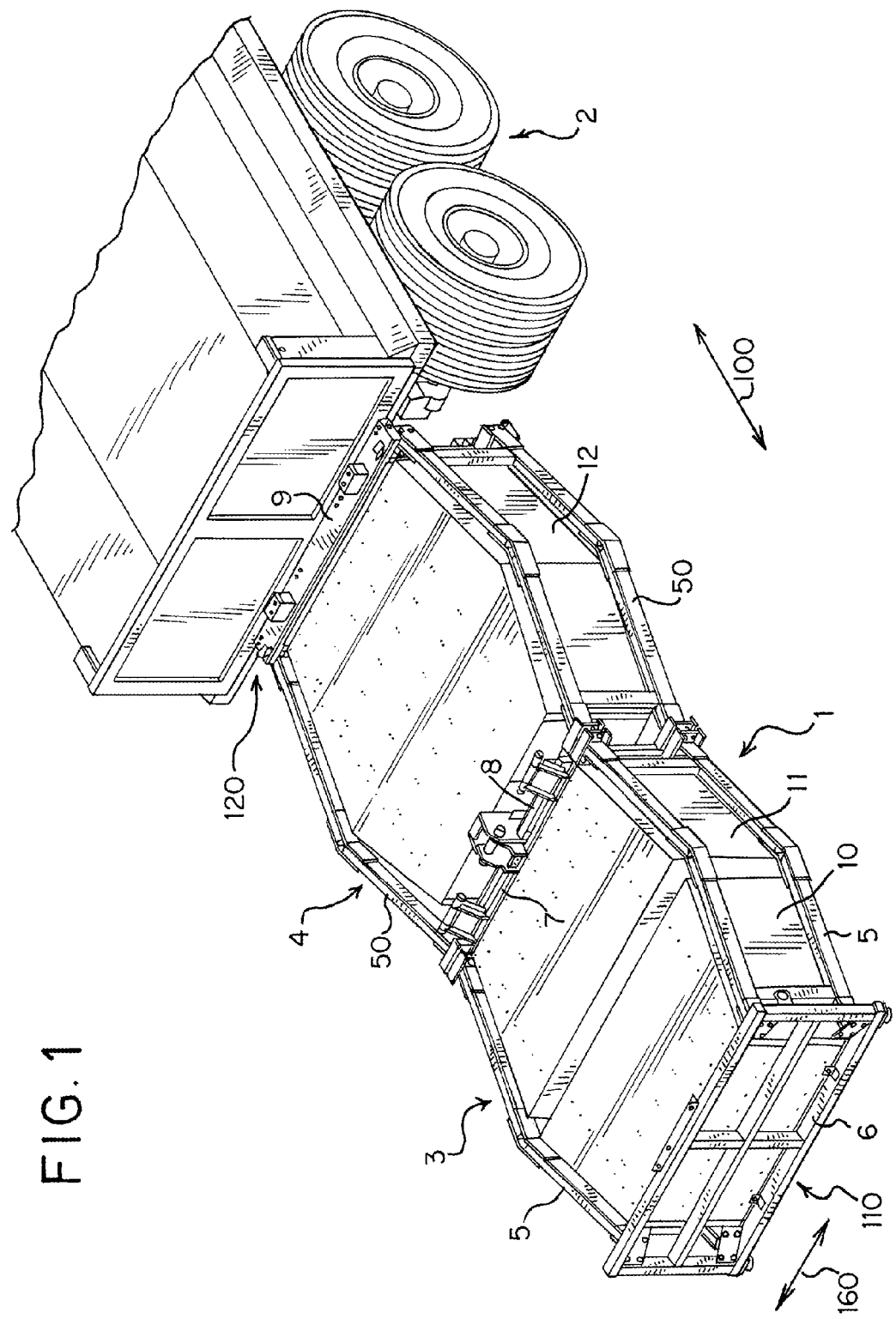
FIG. 1 is a rear perspective view of a crash attenuator attached to a vehicle in a deployed position.

It should be understood that the term "longitudinal," as used herein means of or relating to length or the lengthwise direction 100 between an impact end 110 and an attachment end 120 of a crash attenuator 1, and is aligned with and defines an "axial impact direction" which is generally parallel to the direction of traffic flow. The term "lateral," as used herein, means directed between or toward (or perpendicular to) the sides of the crash attenuator in a sideways direction 160. The term "front," "forward," "forwardly," and variations thereof refer to the position or orientation relative to the attachment end 120, which connects the crash attenuator 1 to a shadow vehicle 2 or the like, while the term "rear, "rearward," "rearwardly," and variations thereof refer to the position or orientation relative to the impact end 110 of the crash attenuator 1, which receives an impacting vehicle. The term "downstream" refers to the position or orientation moving away from the impact end 110 and toward the attachment end 120 of the crash attenuator 1, while the term "upstream" refers to the position or orientation moving toward the impact end 110 and away from the attachment end 120 of the crash attenuator 1. Therefore, for example, a component positioned downstream of another component is closer to the attachment end 120, and vice versa, a component positioned upstream of another component is closer to the impact end 110. The term "outboard" refers to the direction or orientation towards the outermost edges of the crash attenuator 1, while the term "inboard" refers to the direction or orientation away from the outermost edges and towards the center of the crash attenuator 1. The term "upper" refers to the vertical direction or orientation towards the top most edge of the crash attenuator 1, while the term "lower" refers to the vertical direction or orientation towards the ground. The term "coupled" means connected to or engaged with, whether directly or indirectly, for example with an intervening member, and does not require the engagement to be fixed or permanent, although it may be fixed or permanent, and includes both mechanical and electrical connection. It should be understood that the use of numerical terms "first," "second" and "third" as used herein does not refer to any particular sequence or order of components; for example "first" and "second" bays may refer to any sequence of such bays, and is not limited to the first and second bays unless otherwise specified. The term "frangible," as used herein means to break into two or more pieces. The term "yield" means to bend or deform, without breaking.

FIG. 1 shows a crash attenuator 1 attached to a shadow vehicle 2. Crash attenuator 1 consists of a rear bay 3 and a front bay 4. Rear bay 3 is composed of impact frame 6 and rear mid frame 7 connected by side frame 5, referred to as arm assemblies 5. Cartridges 10 and 11 are disposed inside of rear bay 3. Front bay 4 is composed of front mid frame 8 and backup frame 9 connected by side frames 50, otherwise referred to as arm assemblies. Cartridge 12 is disposed inside of front bay 4.

Of course it should be understood that a wide range of changes could be made to embodiments described above. For instance, the crash attenuator could be formed into more than two bays and each bay could have one, many, or no cartridges disposed within it. The crash attenuator could also be of the form disclosed in FIG. 1, where the two bays hinge in the middle. Likewise, the crash attenuator could also be designed as described in U.S. Pat. No. 6,092,959, where the attenuator does not hinge between bays, but instead hinges at the back of the support vehicles. Other embodiments would take the form of a trailer attenuator, as described in U.S. Pat. No. 7,874,572, or a single bay with an attached cartridge, as described in U.S. Pat. No. 5,642,792. The entire disclosures of U.S. Pat. Nos. 6,092,959, 7,874,792 and 5,642,792, are hereby incorporated herein by reference.

In preferred embodiments frame elements 5, 6, 7, 8, 9, and 50 are constructed from welded steel, including structural steel tubing plate, angle, and other steel shapes as appropriate. Other embodiments may use other structural materials for these elements, such as aluminum, plastics, fiberglass, and etc. In preferred embodiments, cartridges 10, 11, and 12 are made from aluminum cells, for instance as was described U.S. Pat. No. 4,711,481 and U.S. Pat. No. 6,092,959. Other embodiments may use other appropriate crushable materials such as steel sheet, tin plated steel, plastic, or cardboard covered with an appropriate shell.

Figure 2:
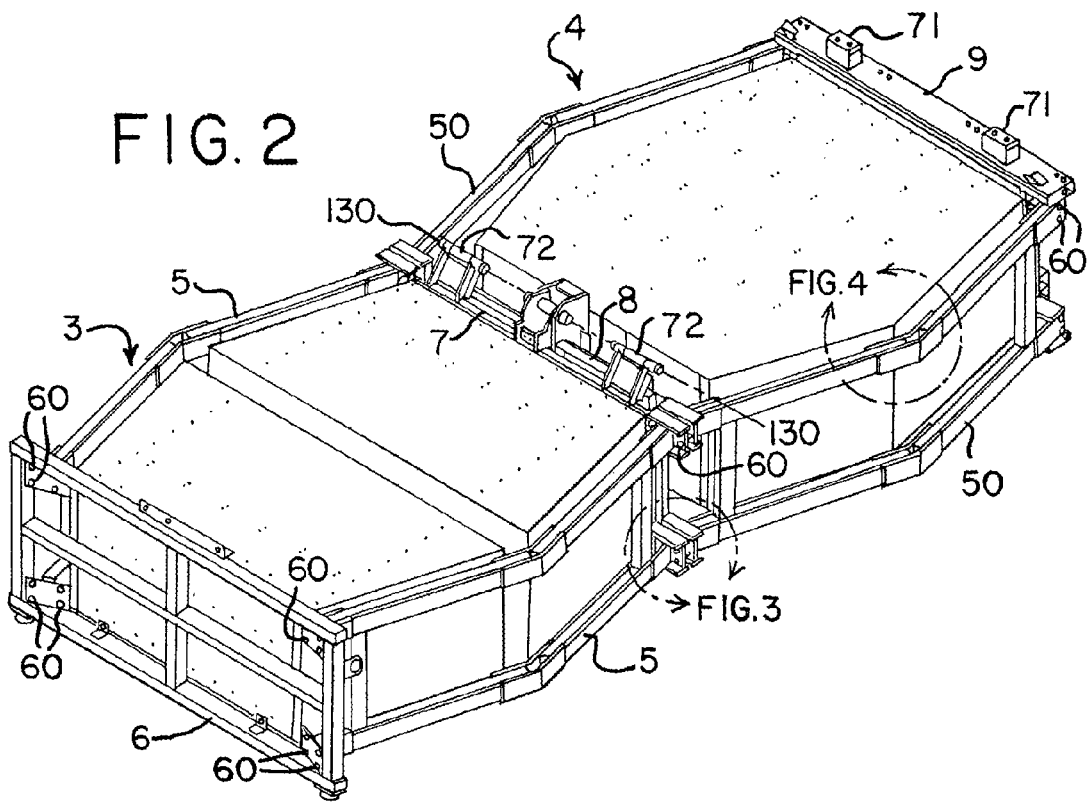
FIG. 2 is a perspective view of the crash attenuator shown in FIG. 1.

FIG. 2 is another view of crash attenuator 1, showing hinge assemblies 72 which joins rear mid frame 7 to front mid frame 8. Hinge assemblies 72 have a rotation axis 130 depicted in FIG. 2. Also shown in FIG. 2 are bumpers 71 upon which rear bay 3 rests when it has rotated 180 degrees around rotation axis 130. Also shown in FIG. 2 are fasteners 60. Fasteners 60 join arms 5 to impact frame 6 and rear mid frame 7. Fasteners 60 also join arms 50 to front mid frame 8 and backup frame 9.

Figure 3:
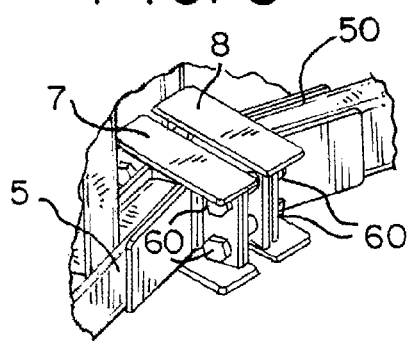
FIG. 3 is an enlarged partial view showing a connection between different frame elements take along line 3 of FIG. 2.

FIG. 3 is a detail view of the connection of side frames 5 and 50 to midframes 7 and 8. Specifically, FIG. 3 shows side frame 5 connected to rear mid frame 7 with fasteners 60. FIG. 3 also shows side frame 50 connected to front mid frame 8 with additional fasteners 60.

Figure 4:
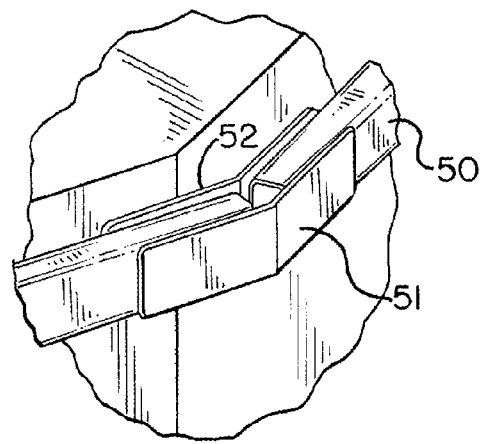
FIG. 4 is an enlarged partial view showing the hinge section of a side frame element taken along line 4 of FIG. 2.

FIG. 4 is a detail of the center hinge section of side frame 50 showing inner plate 52 and outer plate 51.

FIG. 5 is a view of crash attenuator 1 where rear bay 3 has been rotated 180 degrees around rotation axis 130, so that the top rear of impact frame 9 is resting on bumpers 71 (not shown). FIG. 5 also shows centrally located hydraulic cylinder 70 which has extended, actuating rotation mechanism 73, which in turn has caused rear mid frame 7 to rotate in relation to front mid frame 8 about rotation axis 130 via hinge assemblies 72. Further details of hydraulic cylinder 70 and rotation mechanism 73 can be found in U.S. Pat. No. 6,905,282.

FIG. 6 is a view of side frame 5 of crash attenuator 1. Side frame 5 includes first frame members 85, configured and otherwise referred to as rear tubes 85, joined with second frame members, configured and otherwise referred to as front tubes 86, with hinge assemblies 380, including outer hinge members 80 and inner hinge members 81. In the embodiment shown in FIG. 6, outer hinge members 80 are made from thinner material than inner hinge members 81, and are configured as plates in one embodiment. Although two hinge members 80 and 81 are shown in FIG. 6, it should be understood that some designs may only contain one hinge member, for instance, by eliminating either outer hinge member 80 or inner hinge member 81.

FIG. 6 also shows vertical members 87 which join corresponding pairs of rear tubes 85 and front tubes 86, giving the side frame 5 additional rigidity and constraining the top tube members to the bottom tube members. Although the vertical members 87 are beneficial in many designs, there are other designs that may make use of additional vertical members, or no vertical members at all, resulting in two separate pairs of arm members. There may also be designs that make use of angles members, as disclosed in U.S. Pat. No. 6,092,959. It should also be understood that other types of structural elements could be used for tubes 85, 86, and 87, such as angles, round sections, C-channels, T-sections, I-sections, E-sections and etc. It should also be understood that other shapes or materials could be used for hinge members 80 and 81.

At the ends of first and second frame members, or rear tubes 85 and front tubes 86, are placed outer attachment brackets 82 and inner attachment brackets 83. In the embodiment shown in FIG. 6, the various elements of the side frame 5 are held together by welding, however other methods of assembly including bolting, riveting, brazing, and etc. could be used. It should also be understood that in some embodiments, attachment brackets 82 and 83 could be integrally formed from the first and second frame members 85 and 86. Although two attachment brackets 82 and 83 are shown in FIG. 6, it should be understood that some designs may only contain one attachment bracket, for instance, by eliminating either outer attachment bracket 82 or inner attachment bracket 83.

Outer attachment brackets 82 and inner attachment brackets 83 are provided with mounting holes 90 to allow fasteners 60 (not shown) to attach the side frame 5 to other members of the frame of crash attenuator 1. Other embodiments may use other assembly methods, such as riveting welding, brazing, and etc. instead of bolts. Although outer attachment brackets 82 are of a similar design to inner attachment brackets 83 in the embodiment shown in FIG. 6, it should be realized that different embodiments may have different designs. For instance, in some embodiments, the brackets may be of different thicknesses, for example inner bracket 83 may be constructed from a thinner material than outer bracket 82.

FIG. 7 is a view of side frame 50 of crash attenuator 1. Side frame 50 consists of first frame members, configured and referred to as rear tubes 185 in one embodiment, which are joined with second frame members, configured and referred to as front tubes 186, with hinge assemblies 480, including outer hinge members 180 and inner hinge members 181. In the embodiment shown in FIG. 6, outer hinge members 180 are made from thinner material than inner hinge members 181. FIG. 6 also shows vertical members 187 which join corresponding pairs of rear tubes 185 and front tubes 186, giving front arm 50 additional rigidity and constraining the top tube members to the bottom tube members.

At the ends of rear tubes 185 are placed outer attachment brackets 182 and inner attachment brackets 183. At the ends of front tubes 186 are placed outer straight attachment brackets 184 and inner attachment brackets 183. Although the embodiment shown in FIG. 7 uses different designs for the attachment brackets on the front and the rear of the system, as was disclosed in FIG. 6 similar designs can be used on both locations. There also may be designs that use brackets whose angle is between zero and 90 degrees, or even greater than 90 degrees.

Although rear tubes 85 and 185 and front tubes 86 and 186 are shown as being similar in length in the embodiments of FIGS. 6 and 7, it should be understood that these tubes could be different in length depending upon the needs of a specific design. For instance, in some designs of side frame 5, front tubes 85 may be longer or shorter than rear tubes 86. Other designs may vary the length of the tubes of front arm 50 and still other designs may vary the length of both sets of tubes.

As shown in FIGS. 6 and 7, rear tubes 85 and 185 are angled from a longitudinal direction 100 by the angle 140. Likewise, front tubes 86 and 186 are angled from a longitudinal direction 100 by the angle 150. In this way, the first and second frame members form an obtuse angle therebetween. Angling the arms as shown in FIGS. 6 and 7 promotes hinging of attachment brackets 82, 83, 182, and 183 and subsequent collapse of the crash attenuator frame. Angling the arms also promotes hinging of inner hinge member 181 and failure of outer hinge member 180. In the embodiments of FIGS. 6 and 7, angles 140 and 150 are both set at 15 degrees, although it should be understood that other embodiments may use angles that are greater or lesser than 15 degrees. It should also be understood that some embodiments may use angles that are unequal, for instance, angle 140 could be greater than angle 150, or vice versa.

FIG. 8 shows side frame 500 which may be used as a front arm, a rear arm, or an arm in both locations in crash attenuator 1. Side frame 500 consists of first frame members, configured and referred to as rear tubes 285, which are joined with second frame members, configured and referred to as front tubes 286, with hinge assemblies 580, including outer hinge members 280 and inner hinge members 281. FIG. 8 also shows vertical members 287 which join corresponding pairs of rear tubes 285 and front tubes 286, giving side frame 500 additional rigidity and constraining the top tube members to the bottom tube members. At the ends of rear tubes 285 and front tubes 286 are placed outer attachment brackets 282 and inner attachment brackets 283.

FIG. 9 is a detail view of one of the ends of rear tubes 285. In the embodiment shown in FIGS. 8 and 9, inner attachment bracket 283 contains slot 288, which weakens the section of the material. This causes inner attachment bracket 283 to be weaker than outer attachment bracket 282. During an impact, this weakened region will cause inner attachment bracket 283 to fail before outer attachment bracket 282.

FIG. 10 is a detail view of a pair of the hinge members 280 and 281. Hinge member 280 has slot 289 which causes outer hinge member 280 to be weaker than inner hinge member 281. During an impact, this weakened section will cause outer hinge member 280 to fail before inner hinge member 280.

Although attachment bracket 283 and outer hinge member 280 are weakened by slots 288 and 289, other methods could be used to provide weakened regions and weaken various attachment brackets and hinge members, as is needed in certain designs. For instance, as was previously disclosed, the material used can be of different thicknesses to promote one bracket or hinge member before another. In addition, a hole, or a series of holes could be used in place of slots 288 and 289. Likewise, parts of differing widths could be used, as well as parts that have been heat treated, have notches, or parts of different materials.

Figure 11:
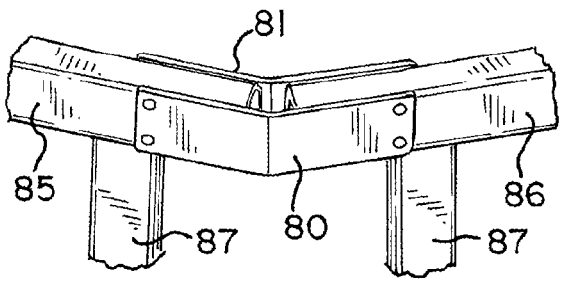
FIGS. 11-13 show the sequential operation of the hinge section during an impact.
Figure 12:
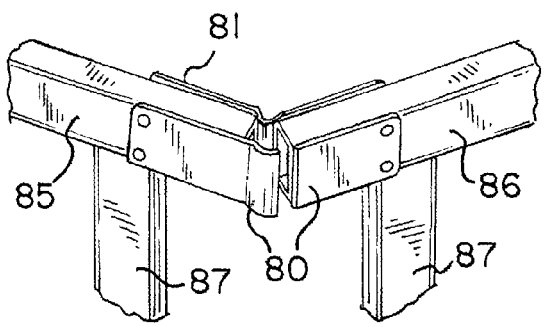
Figure 13:
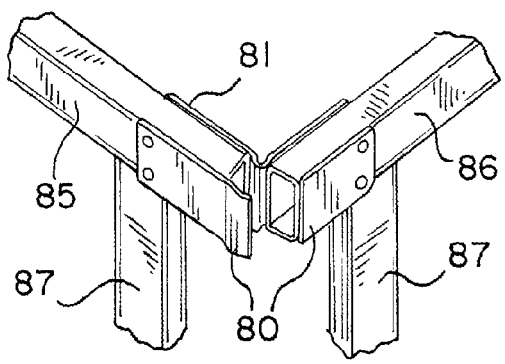

FIGS. 11 through 13 are sequential views of one embodiment of hinge members 80 and 81 during a vehicle impact. FIG. 11 shows hinge members 80 and 81 in an initial, pre-impact condition or configuration. In FIG. 12, rear tube 85 had begun to rotate in relation to front arm 86, due to an impact by a vehicle into crash attenuator 1. The relative rotation of arms 85 and 86 has caused tensile forces in outer hinge member 80 and compressive forces in inner hinge member 81. Because outer hinge member 80 is made of thinner material, the tensile forces cause higher stresses in outer hinge member 80 than are present in inner hinge member 81. This causes outer hinge member 80 to fail and break into two pieces. Meanwhile, inner hinge member 81 has formed a living hinge, allowing the rotation of rear tube 85 in relation to front tube 86. The phrase "living hinge" refers to an integral piece of material having an intermediate region that flexes, including for example and without limitation, a thin flexible plate having opposite end portions and an intermediate portion. The hinge member may be thinned or cut to allow the rigid pieces to bend along the line of the hinge. FIG. 13 shows the side frame after impact, where the first and second frame members 85 86 have rotated further in relation to one another, causing inner hinge member 81 to continue to act as a living hinge.

Figure 14:
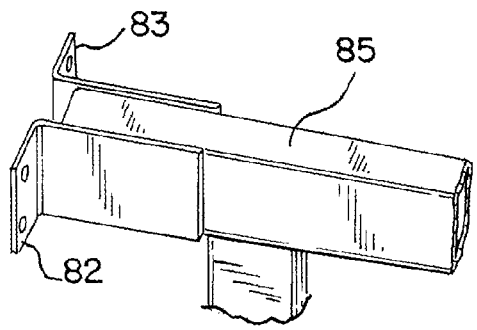
FIGS. 14-16 show the sequential operation of the end attachment sections during an impact.
Figure 15:
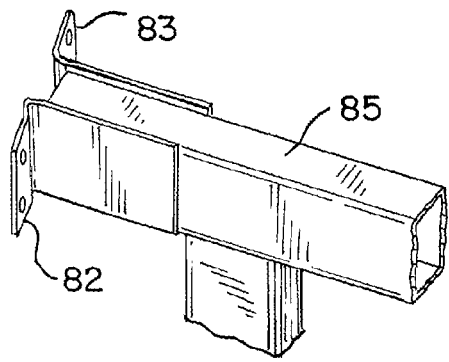
Figure 16:
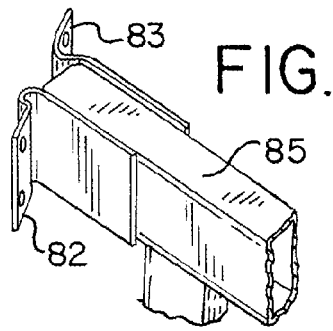

FIGS. 14 through 16 are sequential views of one embodiment of attachment brackets 82 and 83 during a vehicle impact. FIG. 14 shows attachment brackets 82 and 83 in an initial, pre-impact condition or configuration. In FIG. 15, rear tube 85 have begun to rotate due to an impact by a vehicle into crash attenuator 1. The rotation of rear tube 85 causes attachment brackets 82 and 83 to form living hinges. FIG. 16 shows the arm members later in the crash event, where the living hinges in attachment brackets 82 and 83 have allowed continued rotation of rear tube 85.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A crash attenuator comprising:
a pair of laterally spaced side frames each comprising a first frame member and a second frame member rigidly connected with a respective hinge assembly in a pre-impact configuration and wherein said first and second members of each of said side frames are hingedly connected about a vertical hinge axis with one of said respective hinge assemblies in an impact configuration, wherein each of said respective hinge assemblies comprises a living hinge when said hinge assemblies are in said impact configuration, and wherein each of said hinge assemblies comprises a pair of spaced apart hinge members, with at least one of said hinge members defining said living hinge.

2. The crash attenuator of claim 1 wherein said hinge members comprise first and second plate members.

3. The crash attenuator of claim 2 wherein said first plate member is thinner than said second plate member, wherein said first plate member is breakable in said impact configuration such that said second plate member forms said living hinge.

4. The crash attenuator of claim 2 wherein said first plate member comprises a weakened region, wherein said first plate member is breakable along said weakened region in said impact configuration such that said second plate member forms said living hinge.

5. The crash attenuator of claim 4 wherein said weakened region comprises at least one opening.

6. The crash attenuator of claim 4 wherein said weakened region comprises a heated treated region.

7. The crash attenuator of claim 2 wherein said hinge members comprise different materials.

8. The crash attenuator of claim 2 wherein one of said hinge members comprises a fuse that is breakable in said impact configuration, and the other of said hinge members comprises said living hinge.

9. A method of attenuating energy from an impacting vehicle with a crash attenuator, the method comprising:
providing a pair of laterally spaced side frames each comprising a first frame member and a second frame member rigidly connected with a respective hinge assembly in a pre-impact configuration;
impacting the crash attenuator; and
moving said first frame members relative to said second frame members about said respective hinge assembly to an impact configuration, with each of said hinge assemblies acting as a living hinge having a vertical hinge axis as said first and second frame members are moved to said impact configuration, and wherein each of said hinge assemblies comprises a pair of spaced apart hinge members, with at least one of said hinge members defining said living hinge.

10. The method of claim 9 wherein said hinge members comprise first and second plate members.

11. The method of claim 10 wherein said first plate member is thinner than said second plate member, and wherein said moving said first and second frame members comprises breaking said first plate member and wherein said second plate member forms said living hinge.

12. The method of claim 10 wherein said first plate member comprises a weakened region, and wherein said moving said first and second frame members comprises breaking wherein said first plate member along said weakened region in said impact configuration such that said second plate member forms said living hinge.

13. The method of claim 12 wherein said weakened region comprises at least one opening.

14. The method of claim 12 wherein said weakened region comprises a heat treated region.

15. The method of claim 10 wherein said hinge members comprise different materials.

16. The method of claim 10 wherein one of said hinge members comprises a fuse that is breakable in said impact configuration, and the other of said hinge members comprises said living hinge.

17. A crash attenuator comprising:
a pair of laterally spaced side frames and longitudinally spaced front and rear frame members extending between and coupled to said side frames, each of said side frames comprising a first frame member and a second frame member rigidly connected with a respective hinge assembly in a pre-impact configuration and wherein said first and second members of each of said side frames are hingedly connected about a vertical hinge axis with one of said respective hinge assemblies in an impact configuration, wherein each of said respective hinge assemblies comprises a living hinge when said hinge assemblies are in said impact configuration, wherein said first and second frame members each comprise vertically spaced upper and lower frame members.

18. The crash attenuator of claim 17 wherein said upper and lower frame members are joined with a vertical frame member.

19. A crash attenuator comprising:
a pair of laterally spaced side frames and longitudinally spaced front and rear frame members extending between and coupled to said side frames, each of said side frames comprising a first frame member and a second frame member rigidly connected with a respective hinge assembly in a pre-impact configuration and wherein said first and second members of each of said side frames are hingedly connected about a vertical hinge axis with one of said respective hinge assemblies in an impact configuration, wherein each of said respective hinge assemblies comprises a living hinge when said hinge assemblies are in said impact configuration, and an energy absorbing cartridge disposed between said side frames.

20. The method of claim 9 further comprising providing longitudinally spaced front and rear frame members extending between and coupled to said side frames.

21. The method of claim 20 wherein said first and second frame members each comprise vertically spaced upper and lower frame members.

22. The method of claim 21 wherein said upper and lower frame members are joined with a vertical frame member.

23. The method of claim 20 further comprising providing an energy absorbing cartridge disposed between said side frames.

* * * * *